(12) United States Patent
Hisakado et al.

(10) Patent No.: US 8,848,903 B2
(45) Date of Patent: Sep. 30, 2014

(54) DEVICE FOR EVALUATING SIDE-CHANNEL ATTACK RESISTANCE, METHOD FOR EVALUATING SIDE-CHANNEL ATTACK RESISTANCE, AND PROGRAM FOR EVALUATING SIDE-CHANNEL ATTACK

(75) Inventors: Toru Hisakado, Tokyo (JP); Noritaka Yamashita, Tokyo (JP)

(73) Assignee: NEC Corporation, Tokyo (JP)

( * ) Notice: Subject to any disclaimer, the term of this patent is extended or adjusted under 35 U.S.C. 154(b) by 535 days.

(21) Appl. No.: 12/866,360

(22) PCT Filed: Feb. 4, 2009

(86) PCT No.: PCT/JP2009/051864
§ 371 (c)(1),
(2), (4) Date: Aug. 5, 2010

(87) PCT Pub. No.: WO2009/099089
PCT Pub. Date: Aug. 13, 2009

(65) Prior Publication Data
US 2010/0322298 A1 Dec. 23, 2010

(30) Foreign Application Priority Data
Feb. 6, 2008 (JP) ................................. 2008-026374

(51) Int. Cl.
*H04L 29/06* (2006.01)
*H04L 9/06* (2006.01)
*H04L 9/00* (2006.01)

(52) U.S. Cl.
CPC .............. *H04L 9/003* (2013.01); *H04L 9/0625* (2013.01); *H04L 2209/127* (2013.01)
USPC ..................................... 380/1; 28/37; 28/255

(58) Field of Classification Search
CPC .. H04L 9/003; H04L 9/0625; H04L 2209/127
USPC ..................................... 380/2, 28, 37, 255, 1
See application file for complete search history.

(56) References Cited

U.S. PATENT DOCUMENTS

2006/0045264 A1* 3/2006 Kocher et al. .................. 380/37

FOREIGN PATENT DOCUMENTS

| JP | 2006-025288 | 1/2006 |
|----|-------------|--------|
| JP | 2007-116215 | 5/2007 |
| JP | 2007-234001 | 9/2007 |
| WO | WO 02/103377 | 12/2002 |

OTHER PUBLICATIONS

International Search Report, PCT.JP2009/051864, Mar. 3, 2009.

(Continued)

*Primary Examiner* — Jeffrey Pwu
*Assistant Examiner* — Thong Truong
(74) *Attorney, Agent, or Firm* — Young & Thompson

(57) ABSTRACT

A side channel attack resistance evaluation apparatus includes: a measurement section that measures side channel information leaking from an encryption device to be evaluated; a noise removal section that removes noise from the measured side channel information using a band-pass filter (BPF); a passband determination section that determines the passband of the band-pass filter; and a DSCA (Differential Side-Channel Analysis) evaluation section that evaluates resistance against the differential side channel analysis. The passband determination section preferably has a DFT processing section and a power spectrum analysis section, or has a DFT processing and a DFA processing section.

3 Claims, 13 Drawing Sheets

(56) References Cited

OTHER PUBLICATIONS

Honma, Iso Gentei Sokanho o Mochiita Koseido Sabun Denryoku Kaiseki to sono Noise Taisei Hyoka, Symposium on Cryoptography and Information Security 2007 Yokoshu, Jan. 23, 2007, pp. 1 to 6.

Yamashita, "Hi Sesshokugata IC Card i Okeru Denjiha Kaiseki o Riyo shita Ango Alogorithm no Hanbetsu", Symposium on Cryptography and Information Security 2008 Yokoshu, Jan. 22, 2008, pp. 1 to 6.

C.H Gebotys, A countermeasure for EM Attack of a Wireless PDA, [online], Proceedings of the International Conference on Information Technology:Coding and Computing 2005, Apr. 2005, p. 1-p. 6, [retrieved on Feb. 20, 2009], Retrieved from the Internet<URL: http://ieeexplore.Ieee.org/ielx5/9755/30835/0148519.pdf?tp=>.

P. Kocher, J. Jaffe, and B. Jun, "Differential Power Analysis," CRYPTO 99, LNCS 1666, pp. 388-397, 1999.

K. Gandolfi, C. Mourtel, and F. Olivier, "Electromagnetic Analysis: Concrete Results," CHES 2001, LNCS 2162, pp. 251-262, 2001.

C. Gebotys, A. Tiu, EM Analysis of Rijndael and ECC on a Wireless Java-based PDA, CHES 2005, LNCS 3659, pp. 250-265, 2005.

Yuichi Imai, Naofumi Honma, Sei Nagashima, Takafumi Aoki, and Akashi Sato, "High-Resolution Waveform Analysis based on Phase-Only Correlation and its Applications to Side-Channel Attacks," The Institute of Electronics, Information and Communication Engineers, Technical REport, vol. 105, pp. 97-103, 2006.

* cited by examiner

DEVICE FOR EVALUATING SIDE-CHANNEL ATTACK RESISTANCE, METHOD FOR EVALUATING SIDE-CHANNEL ATTACK RESISTANCE, AND PROGRAM FOR EVALUATING SIDE-CHANNEL ATTACK

TECHNICAL FIELD

The present invention relates to a side channel attack resistance evaluation apparatus (device), a side channel attack resistance evaluation method, and a side channel attack resistance evaluation program and, more particularly, to a side channel attack resistance evaluation apparatus (device), a side channel attack resistance evaluation method, and a side channel attack resistance evaluation program that perform highly accurate evaluation of resistance against a differential side channel analysis which side channel information leaking from an encryption device is used.

BACKGROUND ART

A side channel attack is known as a method of attacking an encryption device having an encryption processing function. The side channel attack is an attack that uses side channel information, such as power consumption, electromagnetic waves, processing time, generated during processing in the encryption device to estimate a secret key. In particular, a Differential Side-Channel Analysis (hereinafter called "DSCA") is known as a powerful side channel attack. The DSCA performs statistical processing for a plurality of pieces of side channel information to suppress influence of noise and thereby estimates confidential information. The DSCA includes some approaches which are classified depending on the type of the side channel information used in the attack and are referred to as Differential Power Analysis (hereinafter called "DPA") (refer to NPL 1) in the case where the power consumption is used as the side channel information and Differential Electro-Magnetic Analysis (hereinafter called "DEMA") (refer to NPL 2) in the case where electromagnetic waves are used as the side channel information.

In the DSCA, waveform displacement or waveform noise caused during measurement of the side channel information gives significant influence on the accuracy of the attack. Thus, in order to properly perform estimation of tamper resistance of an encryption device against the DSCA, it is desirable to use side channel information that does not include the displacement or noise.

There are known, as a method of reducing influence of the displacement or noise, a Differential Frequency Analysis (hereinafter called "DFA") (refer to NPL 4) and a phase-only correlation (refer to NPL 3).

The DFA applies Discrete Fourier Transform (hereinafter called "DFT") to the side channel information measured in the time domain to transform the side channel information into a frequency domain to thereby calculate the intensity (power spectrum) for each frequency component and then applies the DSCA to the power spectrum. This DFA is effective for time-displacement of waveforms at the measurement time.

The phase-only correlation is a phase method that estimates displacement at the measurement time from a phase component obtained by applying the DFT to the measured side channel information with an accuracy exceeding the sampling resolution in a measuring device and corrects the estimated displacement. This phase-only correlation is effective for time-displacement of waveforms at the measurement time, as in the case of the DFA. Further, by using the phase-only correlation in combination with a low-pass filter or a band-pass filter (hereinafter called "BPF"), noise can be removed.

CITATION LIST

Patent Literature

{NPL 1} P. Kocher, J. Jaffe, and B. Jun, "Differential Power Analysis," CRYPTO '99, LNCS1666, pp. 388-397, 1999.
{NPL 2} K. Gandolfi, C. Mourtel, and F. Olivier, "Electromagnetic Analysis: Concrete Results," CHES 2001, LNCS 2162, pp. 251-262, 2001.
{NPL 3} C. Gebotys, A. Tiu, "EM Analysis of Rijndael and ECC on a Wireless Java-based PDA," CHES 2005, LNCS 3659, pp. 250-625, 2005.
{NPL 4} Yuichi Imai, Naofumi Honma, Sei Nagashima, Takafumi Aoki, and Akashi Sato, "High-Resolution Waveform Analysis Based on Phase-Only Correlation and Its Application to Side-Channel Attacks," The Institute of Electronics, Information and Communication Engineers, Technical Report, vol. 105, pp. 97-103, 2006.

SUMMARY OF INVENTION

Technical Problem

The estimation of tamper-resistance of an encryption device against the DSCA is desirable to be performed using side channel information that does not include the displacement or noise at the measurement time. However, the DFA is effective for the displacement at the measurement time but does not consider the noise. Further, the phase-only correlation mainly targets the displacement at the measurement time. As to the noise, although a method using the BPF in combination with the phase-only correlation is proposed, setting of an optimum passband is not specified. Thus, it is difficult to effectively remove the noise in the phase-only correlation.

An exemplary object of the present invention is therefore to provide an apparatus (device) that applies the BPF to the DSCA for the purpose of the noise removal to determine a passband suitable for the DSCA and remove the noise unnecessary for an attack so as to enable highly accurate evaluation of tamper resistance.

Solution to Problem

To attain the above object, an exemplary side channel attack resistance evaluation apparatus (device) according the present invention performs evaluation of resistance against differential side channel analysis using side channel information leaking from an encryption device, said apparatus including: a measurement section that measures the side channel information leaking from the encryption device; a noise removal section that removes noise from the side channel information measured by the measurement section, by using a band-pass filter; a passband determination section that determines the passband of the band-pass filter used in the noise removal section, by using the side channel information measured by the measurement section; and an evaluation section that applies differential side channel analysis to the side channel information that has been subjected to the noise removal by the noise removal section and evaluates resistance against the differential side channel analysis.

An exemplary side channel attack resistance evaluation method according to the present invention performs evaluation of resistance against differential side channel analysis using side channel information leaking from an encryption device, said method including: measuring the side channel information leaking from the encryption device; determining the passband of a band-pass filter using the measured side channel information; removing noise from the measured side channel information by using the band-pass filter for which the passband has been determined; and applying differential side channel analysis to the side channel information that has been subjected to the noise removal and evaluating resistance against the differential side channel analysis.

An exemplary side channel attack resistance evaluation program according to the present invention allows a computer that performs evaluation of resistance against differential side channel analysis using side channel information leaking from an encryption device to execute: processing of determining the passband of a band-pass filter by using the measured side channel information leaking from the encryption device; processing of removing noise from the measured side channel information by using the band-pass filter for which the passband has been determined; and processing of applying differential side channel analysis to the side channel information that has been subjected to the noise removal and evaluating resistance against the differential side channel analysis.

Advantageous Effects of Invention

According to the present invention, optimum noise removal for DSCA can be achieved to enable highly accurate evaluation of resistance against side channel attack.

DESCRIPTION OF EMBODIMENTS

A preferred embodiment for practicing the present invention will be described in detail with reference to the accompanying drawings.

Figure 1:
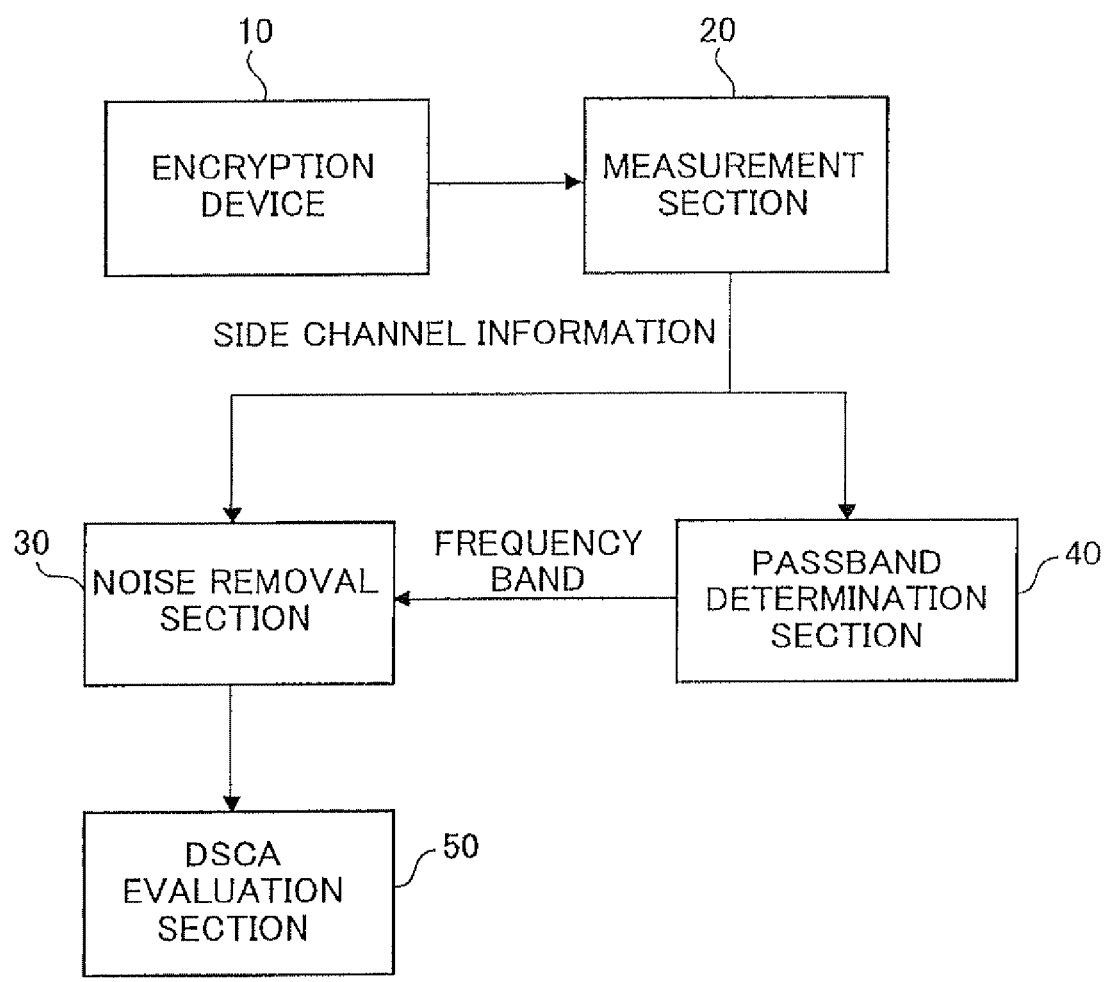
{FIG. 1} A view illustrating a schematic configuration of a side channel attack resistance evaluation apparatus according to an exemplary embodiment of the present invention.

FIG. 1 is a view illustrating a schematic configuration of a side channel attack resistance evaluation apparatus according to an exemplary embodiment of the present invention.

As shown in FIG. 1, the side channel attack resistance evaluation apparatus includes a measurement section 20 for measuring side channel information of an encryption device 10 to be evaluated, a noise removal section 30 for removing noise from the measured side channel information by means of a BPF, a passband determination section 40 for determining the passband of the BPF, and a DSCA evaluation section 50 for evaluating resistance against a DSCA.

The encryption device 10 performs encryption/decryption processing of encrypting a plain text and decrypting an encrypted text. As the encryption device 10, various information processors executing encryption/decryption processing may be adopted. For example, a PC (Personal Computer), a mobile terminal, an IC card or the like may be adopted.

The measurement section 20 measures side channel information leaking from the encryption device 10 at the time when the encryption device 10 performs the encryption/decryption processing. As the side channel information, various information subject to influence by internal processing in the encryption device 10 may be adopted. For example, power, electromagnetic waves, sound, temperature, or the like may be adopted. In the case where electromagnetic wave is used as the side channel information, an oscilloscope or a spectrum analyzer may be adopted as the side channel information measurement section 20.

The noise removal section 30 uses the BPF to remove noise unnecessary for the DSCA. The noise is included in the side channel information measured by the measurement section 20. The passband of the BPF is determined by the passband determination section 40.

The passband determination section 40 determines the passband of the BPF used in the noise removal section 30 based on the side channel information measured by the measurement section 20.

The DSCA evaluation section 50 applies the DSCA to the side channel information that has been subjected to the noise removal by the noise removal section 30 and performs evaluation on whether confidential information can be derived or not and on the amount of the side channel information necessary for deriving the confidential information.

Figure 2:
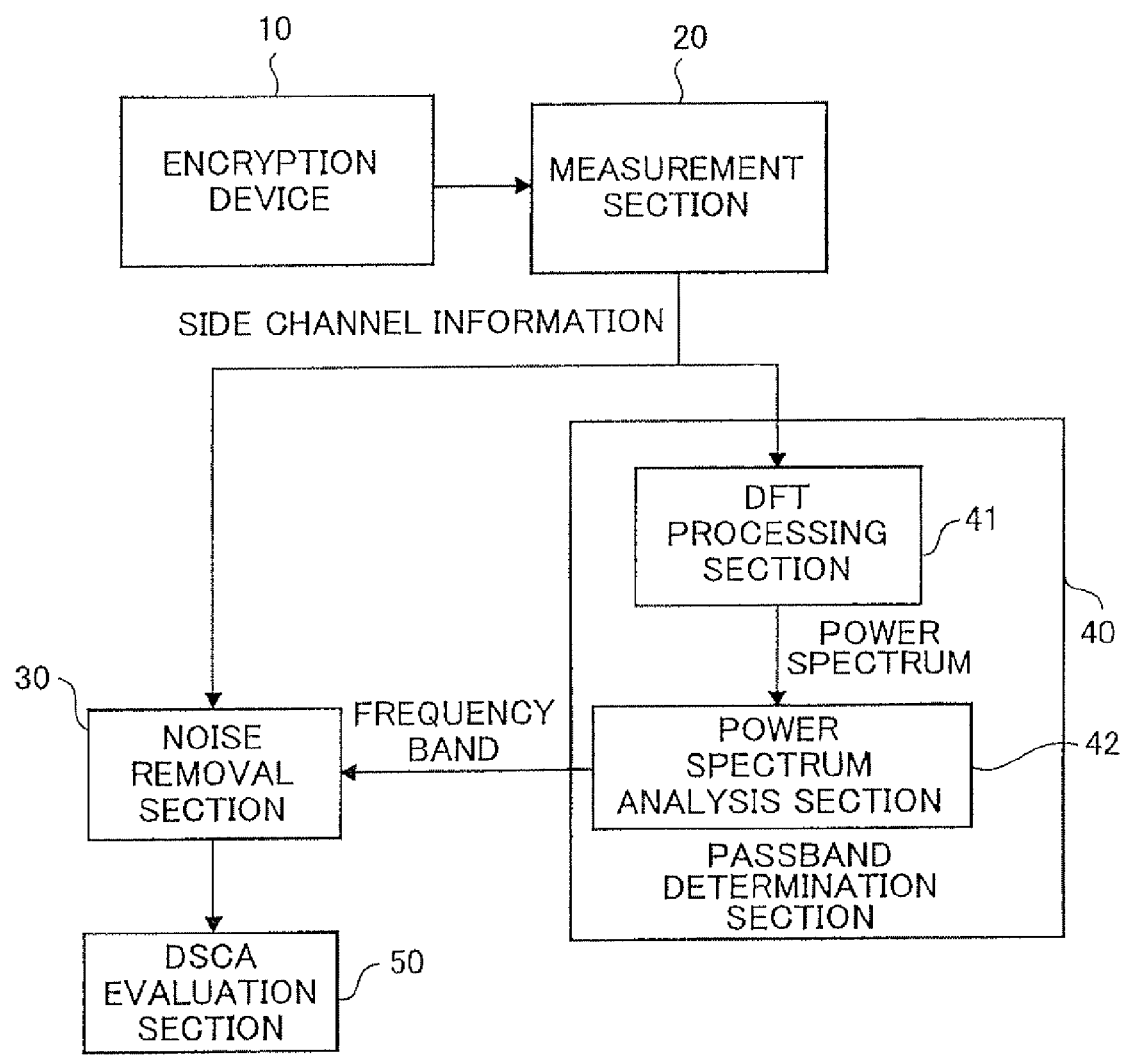
{FIG. 2} A view illustrating a side channel attack resistance evaluation apparatus according to a first exemplary embodiment of the present invention.

With reference to FIG. 2, a configuration example of the passband determination section 40 will be described.

As illustrated in FIG. 2, in the passband determination section 40 of this example, a DFT processing section 41 calculates the power spectrum of the side channel information measured by the measurement section 20 and then a power spectrum analysis section 42 calculates a frequency component having high intensity from the shape of the power spectrum. The calculated frequency component is set as the passband used when the noise removal section 30 performs BPF processing.

Figure 3:
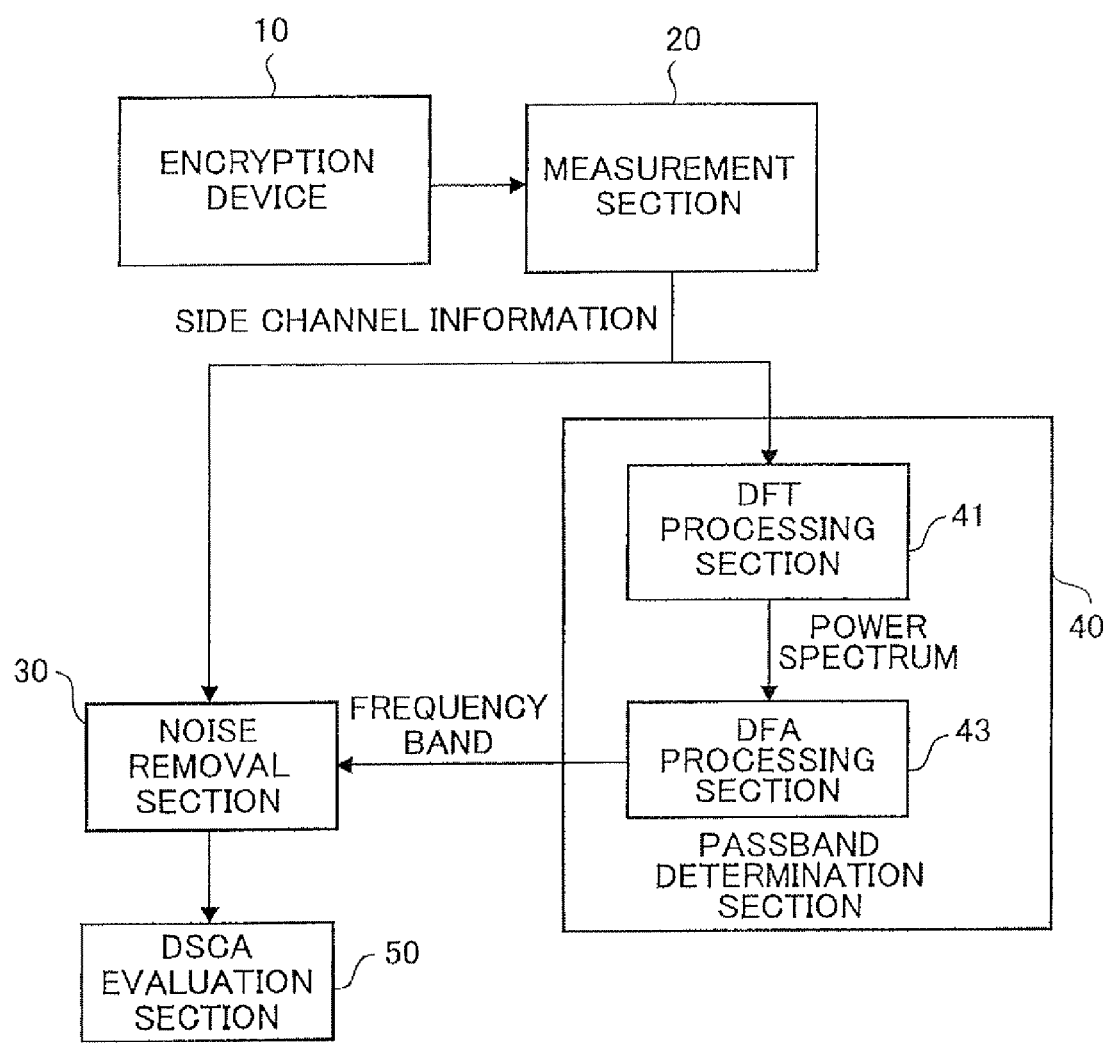
{FIG. 3} A view illustrating a side channel attack resistance evaluation apparatus according to the first exemplary embodiment of the present invention.

With reference to FIG. 3, another configuration example of the passband determination section 40 will be described.

As illustrated in FIG. 3, in the passband determination section 40 of this example, the DFT processing section 41 calculates the power spectrum of the side channel information measured by the measurement section 20 and then a DFA processing section 43 applies the DFA to the power spectrum in the frequency domain. In the DFA, a high peak is generated at a specified frequency component when correct confidential information is estimated. Thus, the frequency component at which a high peak is generated is determined as the passband of the BPF used in the noise removal section 30.

Figure 10:
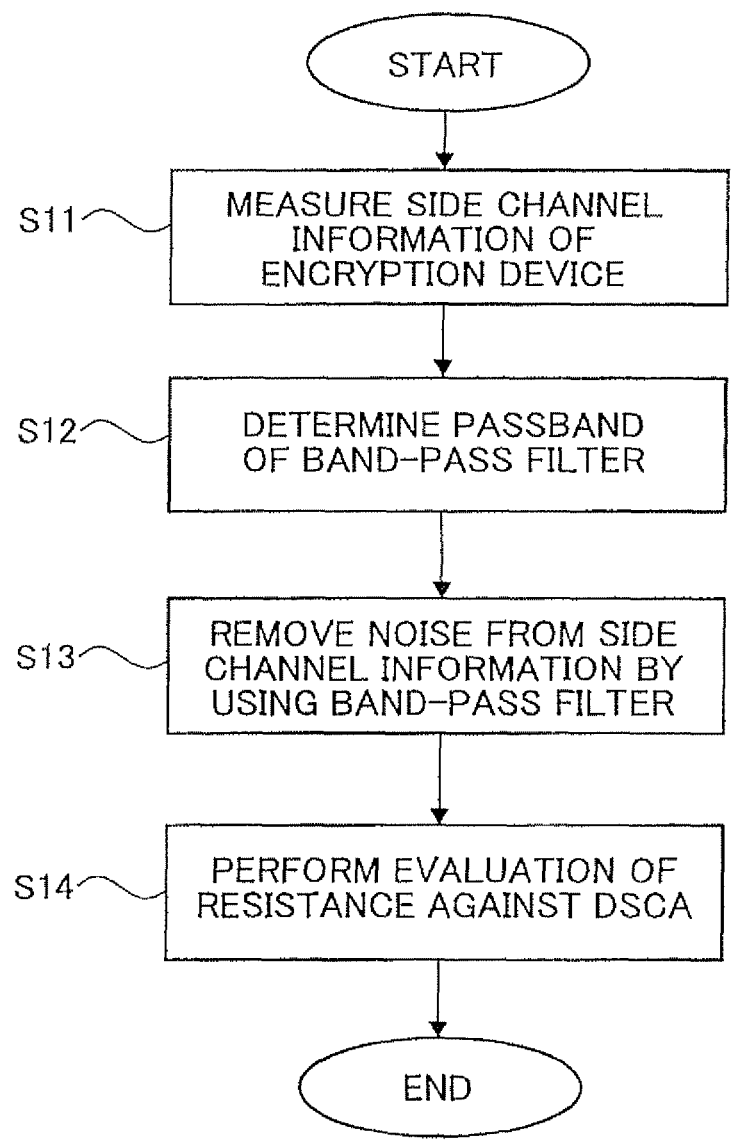
{FIG. 10} A flowchart illustrating operation of the side channel attack resistance evaluation apparatus of FIG. 1.
Figure 11:
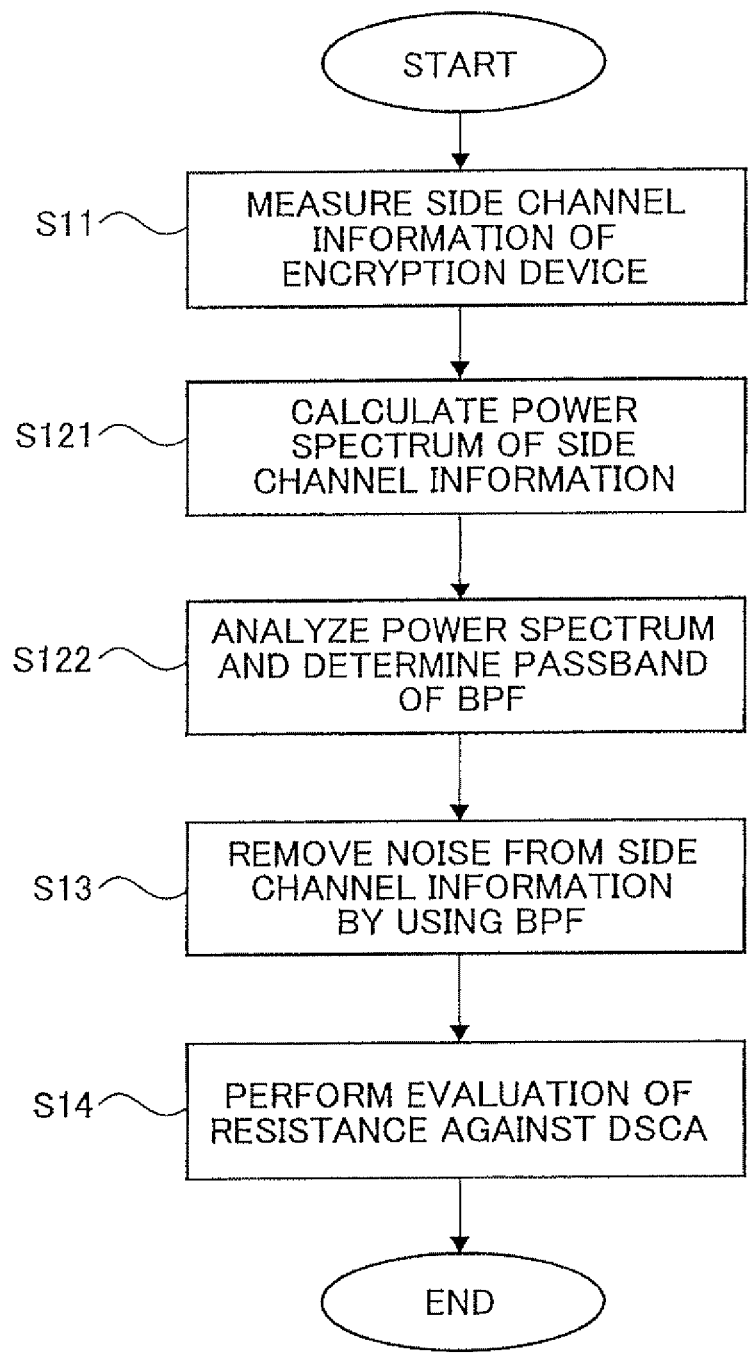
{FIG. 11} A flowchart illustrating operation of the side channel attack resistance evaluation apparatus including operation of a passband determination section of FIG. 2.
Figure 12:
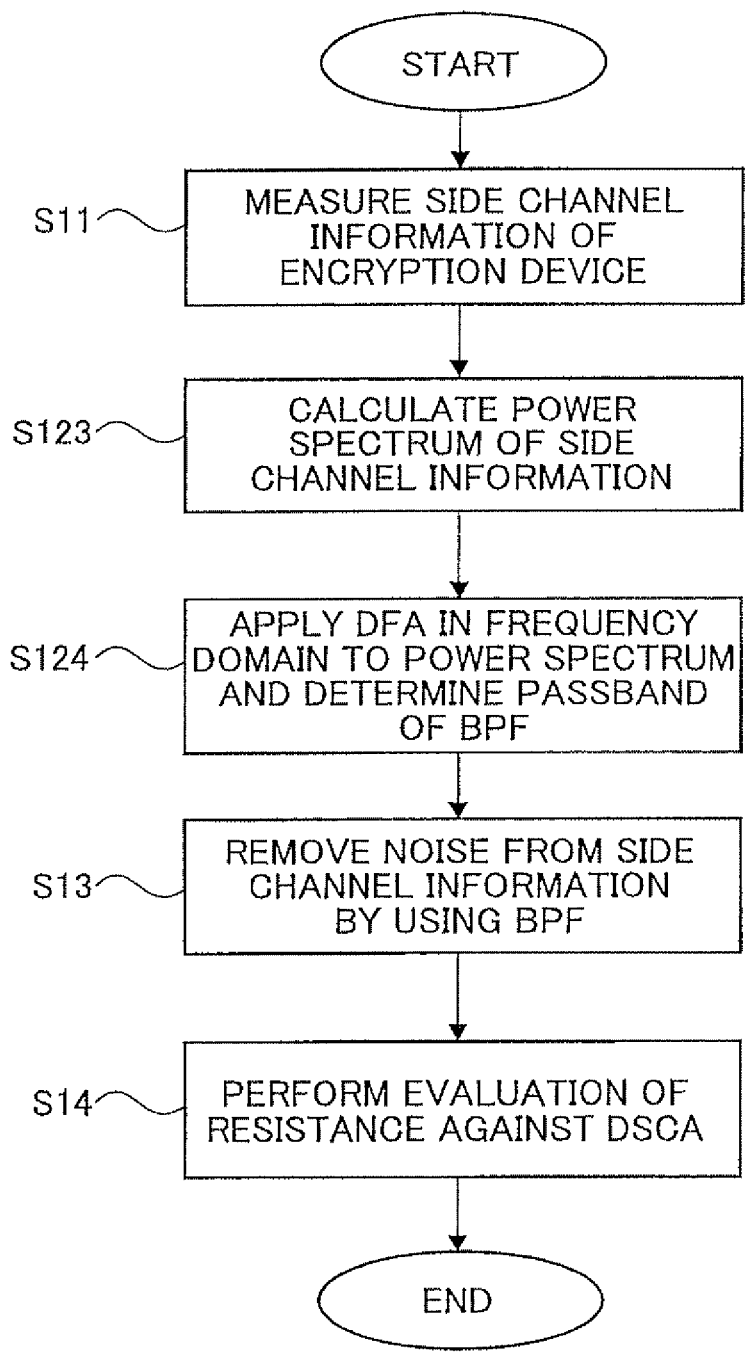
{FIG. 12} A flowchart illustrating operation of the side channel attack resistance evaluation apparatus including operation of the passband determination section of FIG. 3.

FIG. 10 is a flowchart illustrating operation of the side channel attack resistance evaluation apparatus of FIG. 1. FIG. 11 is a flowchart illustrating operation of the side channel attack resistance evaluation apparatus of FIG. 1 including operation of the passband determination section of FIG. 2. FIG. 12 is a flowchart illustrating operation of the side channel attack resistance evaluation apparatus of FIG. 1 including operation of the passband determination section of FIG. 3.

As illustrated in FIG. 10, the measurement section 20 measures side channel information of the encryption device 10 to be evaluated (step S11). After that, the passband determination section 40 determines the passband of the BPF used in the noise removal section 30 based on the side channel information measured by the measurement section 20 (step S12).

As illustrated in FIG. 11, in the passband determination operation, the DFT processing section 41 calculates the power spectrum of the side channel information (step S121), and the power spectrum analysis section 42 calculates a frequency component having high intensity based on the shape of the power spectrum. Then, the calculated frequency component is determined as the passband used in the BPF processing (step S122).

Alternatively, as illustrated in FIG. 12, in another passband determination operation, the DFT processing section 41 calculates the power spectrum of the side channel information (step S123), and DFA processing section 43 applies the DFA in the frequency domain to the power spectrum. Then, a specific frequency component at which a high peak is generated by DFA is determined as the passband of the BPF (step S124).

Then, the noise removal section 30 uses the BPF to remove noise unnecessary for the DSCA (step S13). The noise is included in the side channel information measured by the measurement section 20. Subsequently, the DSCA evaluation section 50 applies the DSCA to the side channel information that has been subjected to the noise removal by the noise removal section 30 and performs evaluation on whether confidential information can be derived or not and on the amount of the side channel information necessary for deriving the confidential information (step S14).

Examples of the present invention will be described below with reference to the accompanying drawings.

Example 1

In the present example, the side channel attack resistance was evaluated in the abovementioned first exemplary embodiment. More specifically, a DES encryption was implemented in an evaluation board (encryption device 10) that can execute encryption processing, an oscilloscope (measurement section 20) was used to measure electromagnetic waves (side channel information) leaking from the evaluation board that was processing the DES, and the side channel attack resistance against the DSCA was evaluated using the measured electromagnetic waves.

Figure 4:
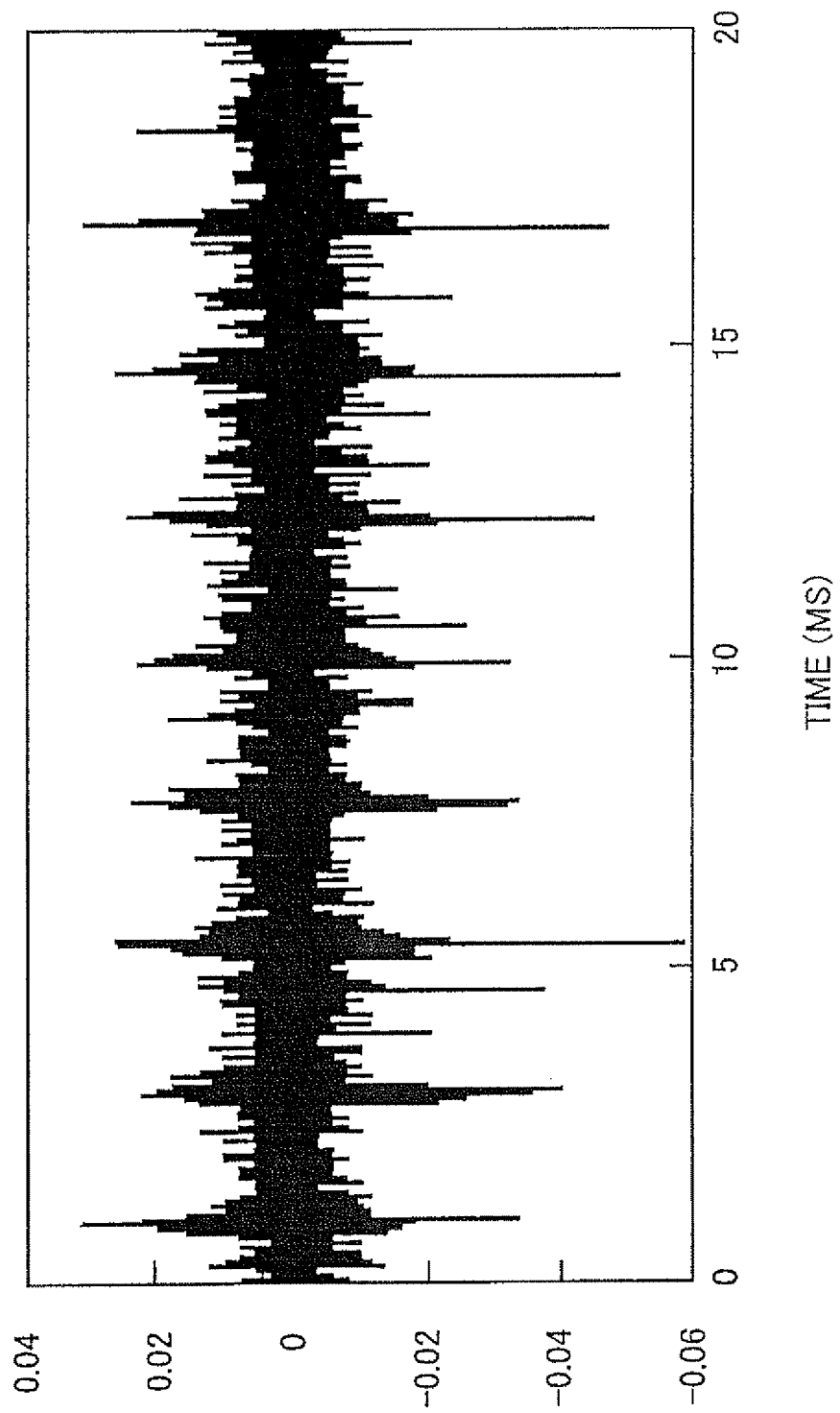
{FIG. 4} A view illustrating an electromagnetic waveform leaking from an encryption device in Examples 1 and 2 of the present invention.
Figure 5:
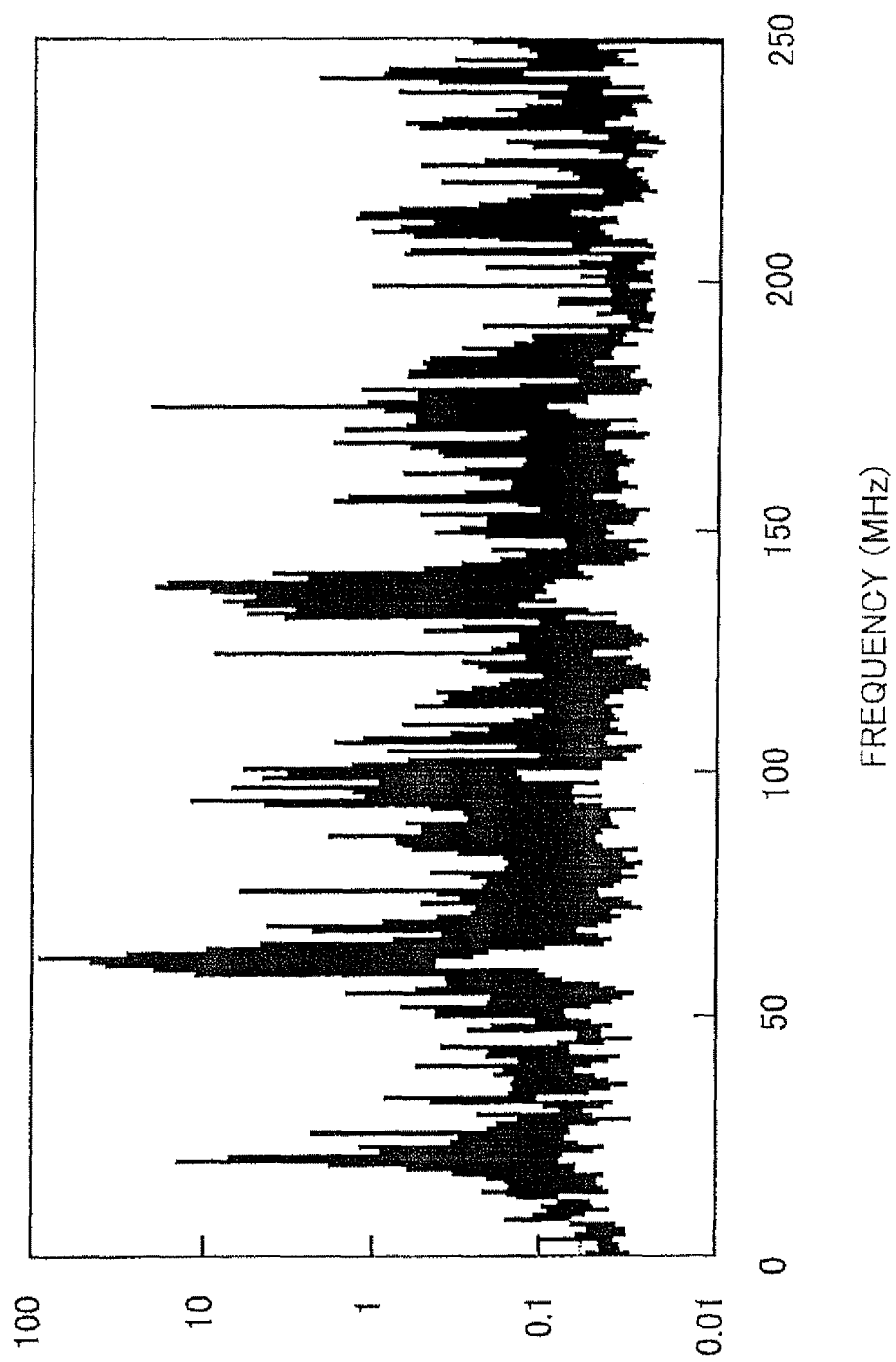
{FIG. 5} A view illustrating a power spectrum waveform of the leaking electromagnetic waves in Examples 1 and 2 of the present invention.

The DES was implemented in the evaluation board, encryption processing is performed for a plurality of plain texts, and leaking electromagnetic waves corresponding to the respective encrypted plain text were measured. FIG. 4 is a waveform diagram illustrating the measured leaking electromagnetic waves (FIG. 4). Subsequently, the DFT processing was applied to a given one waveform of the measured electromagnetic waveforms to calculate the power spectrum. FIG. 5 is a view illustrating a power spectrum waveform of the leaking electromagnetic waves.

Then, a frequency band having high intensity was selected from the calculated power spectrum. In this example, the waveform diagram of FIG. 5 was used to visually select four frequency bands of 20 to 25 MHz, 55 to 60 MHz, 95 to 100 MHz, and 140 to 145 MHz as the passbands.

Figure 6:
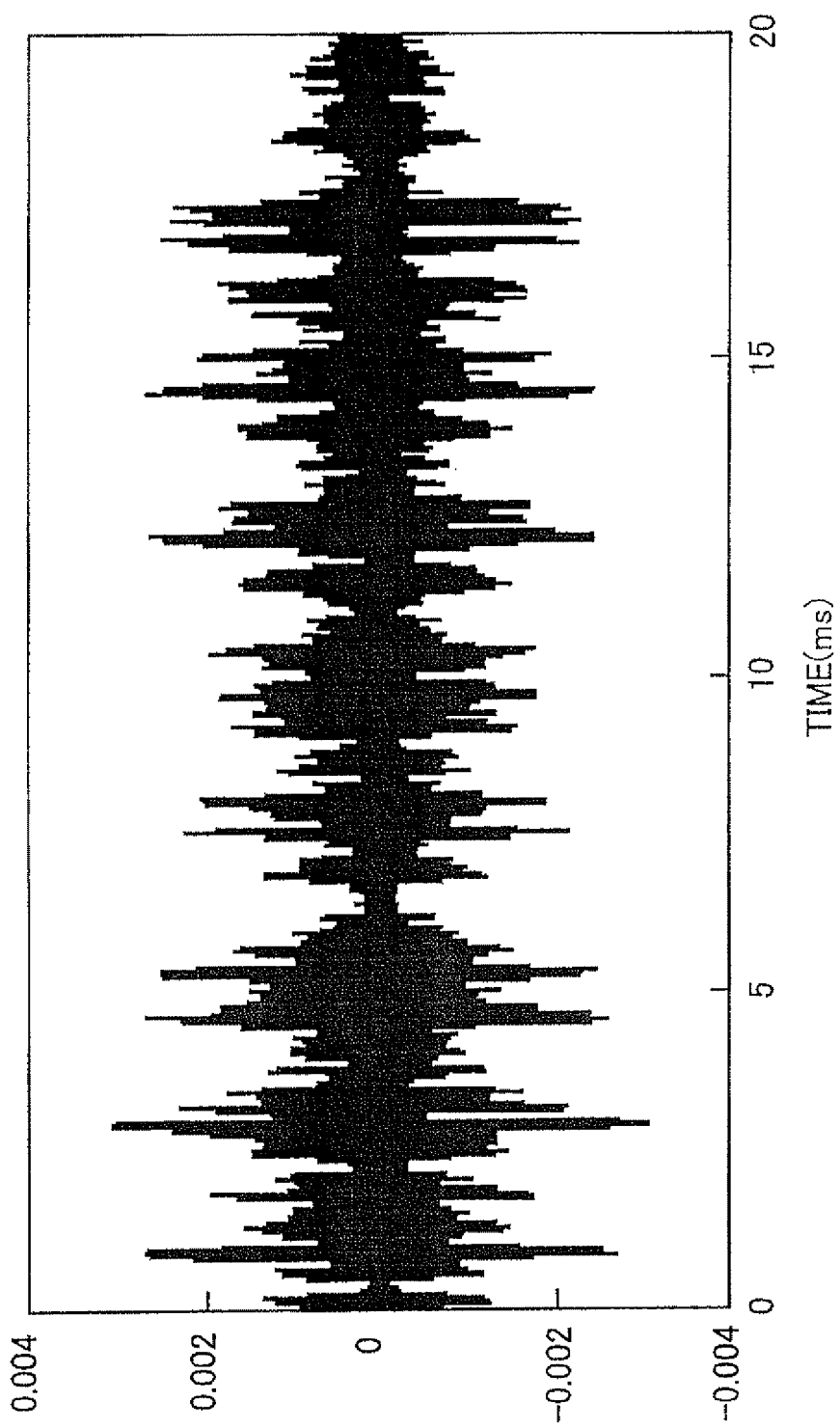
{FIG. 6} A view illustrating a leaking electromagnetic waveform after noise removal in Examples 1 and 2 of the present invention.

Then, in the noise removal section 30, the selected passbands were set as the passbands of the BPF, and noise was removed. FIG. 6 illustrates an electromagnetic waveform after noise removal in the case where a frequency band of 20 to 25 MHz is set as the passband.

Finally, in the DSCA evaluation section 50, the DSCA was applied to the electromagnetic wave after noise removal. In the DSCA analysis for the DES, an S-BOX output in the F-function in the last 16th round of the DES was selected as a selection function. The F-function has eight S-BOXes each having a 6-bit input/4-bit output nonlinear table. The selection function is defined bit by bit for 4-bit outputs of each of the eight S-BOXes, and 32 analyses are performed for a total of 32 selection functions. For one selection function, 64 confidential information corresponding to 6-bit inputs of each S-BOX are estimated.

Figure 7:
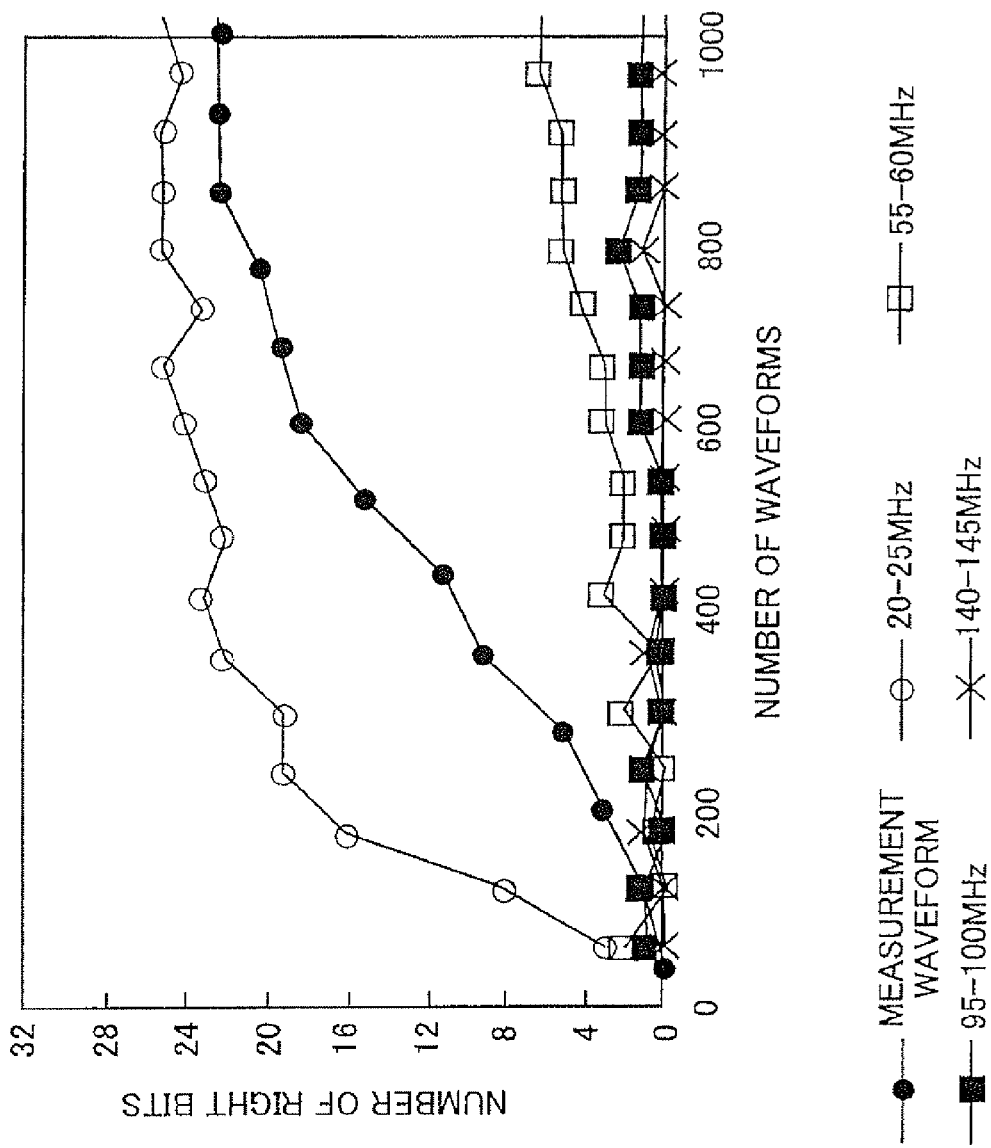
{FIG. 7} A view illustrating relationship between the number of bits exhibiting the success of the analysis and number of waveforms in electromagnetic waveforms from which noise has been removed by the BPF having the set passbands and a measurement waveform from which noise has not been removed in Example 1 of the present invention.

FIG. 7 illustrates a relationship between the number of bits exhibiting the success of the analysis and number of waveforms in electromagnetic waveforms from which noise has been removed by the BPF having the set passbands and a measurement waveform from which noise has not been removed. An analysis accuracy higher than that in the measurement waveform was not be achieved in all the passbands. However, in the case where the frequency band of 20 to 25 MHz was set as the passband, a larger number of analyses were succeeded with less number of waveforms than in the case where the measurement waveform was used for the analysis, thus exhibiting a high analysis accuracy.

Example 2

As in the case of the Example 1, in the present example, resistance against the DSCA is evaluated in the configuration of the second exemplary embodiment.

Example 2 differs from Example 1 in that the power spectrum is calculated for all the measured electromagnetic waves and that the DFA is used in the passband setting section.

In the DFA used in the passband setting section, the power spectrums of all the measured electromagnetic waveforms are used. Thus, the DFT processing section applies the DFT to all the measured electromagnetic waveforms to transform the waveforms into power spectrums.

Figure 8:
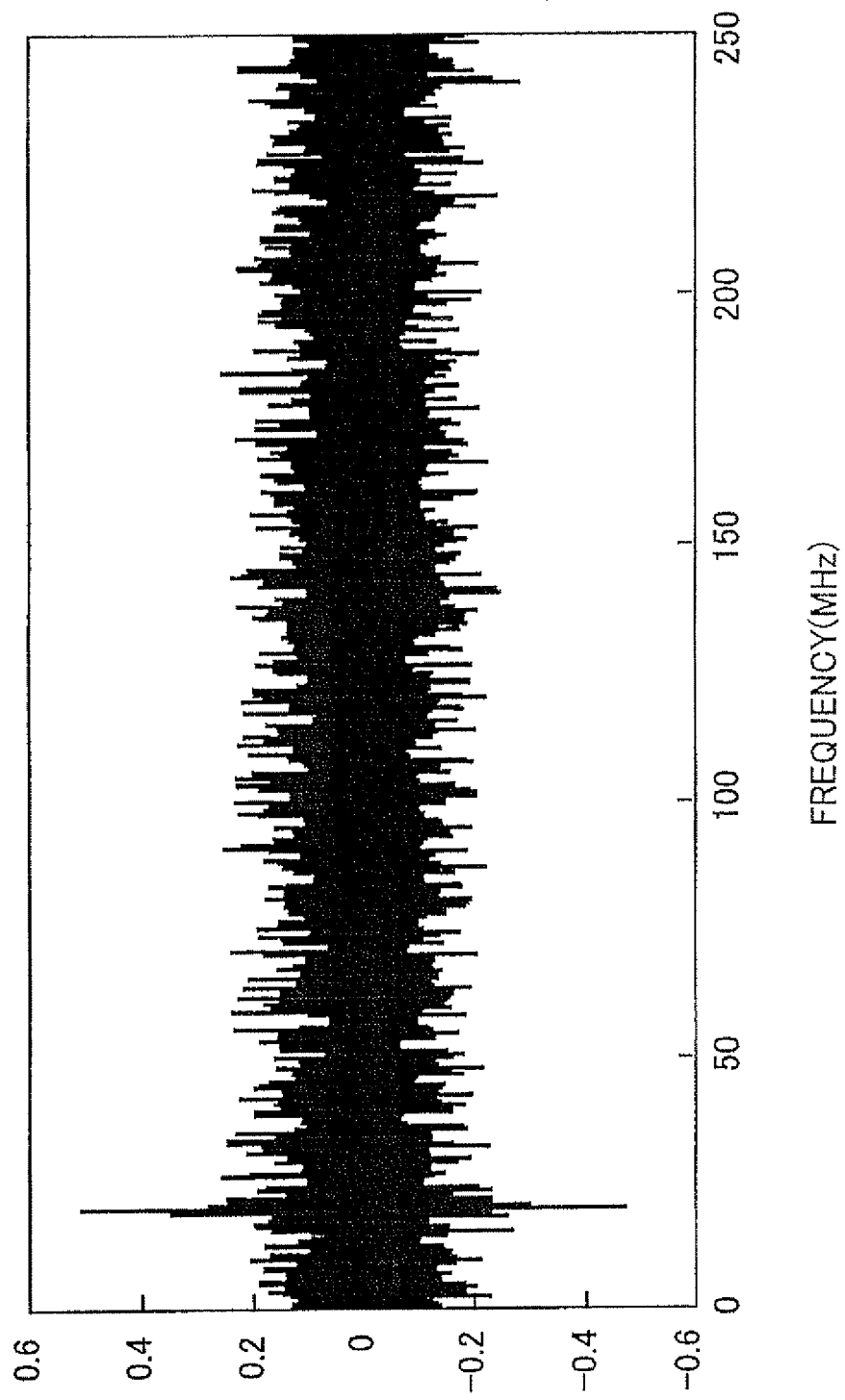
{FIG. 8} A view illustrating a differential waveform obtained in the case where correct confidential information was obtained in DFA in Example 2 of the present invention.

Then, a given one selection function of the selection functions used in the DSCA of Example 1 was used to apply the DFA to the plurality of calculated power spectrums. As a result of application of the DFA, a differential waveform as illustrated in FIG. 8 was obtained in the case where correct confidential information was estimated.

Then, a frequency band having a high peak is selected in the differential waveform. As in the case of Example 1, a frequency band of 20 to 25 MHz was visually selected as the passbands.

Figure 9:
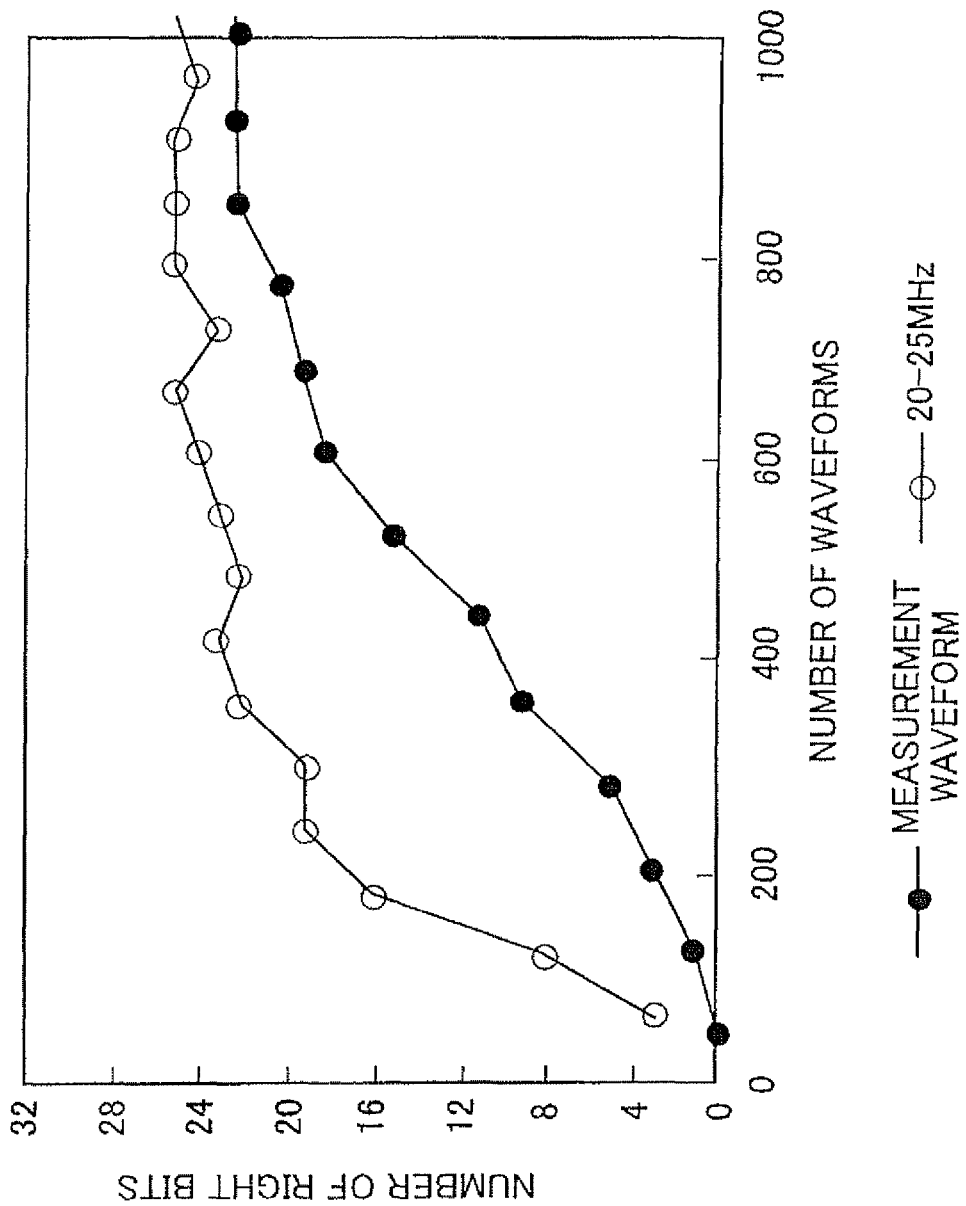
{FIG. 9} A view illustrating a relationship between the number of bits exhibiting the success of the analysis and number of waveforms in an electromagnetic waveform from which noise has been removed by the BPF having the set passband and a measurement waveform from which noise has not been removed in Example 2 of the present invention.

The subsequent noise removal and resistance evaluation by the DSCA were performed in the same procedure as in Example 1. FIG. 9 illustrates a relationship between the number of bits exhibiting the success of the analysis and number of waveforms in an electromagnetic waveform from which noise has been removed by the BPF having the set passband and a measurement waveform from which noise has not been removed. By executing the noise removal, an analysis accuracy higher than that in the measurement waveform was achieved.

Although Examples 1 and 2 described above may be implemented by using hardware such as a dedicated IC or the like, components other than the measurement section may be implemented by using software installed on a computer.

Figure 13:
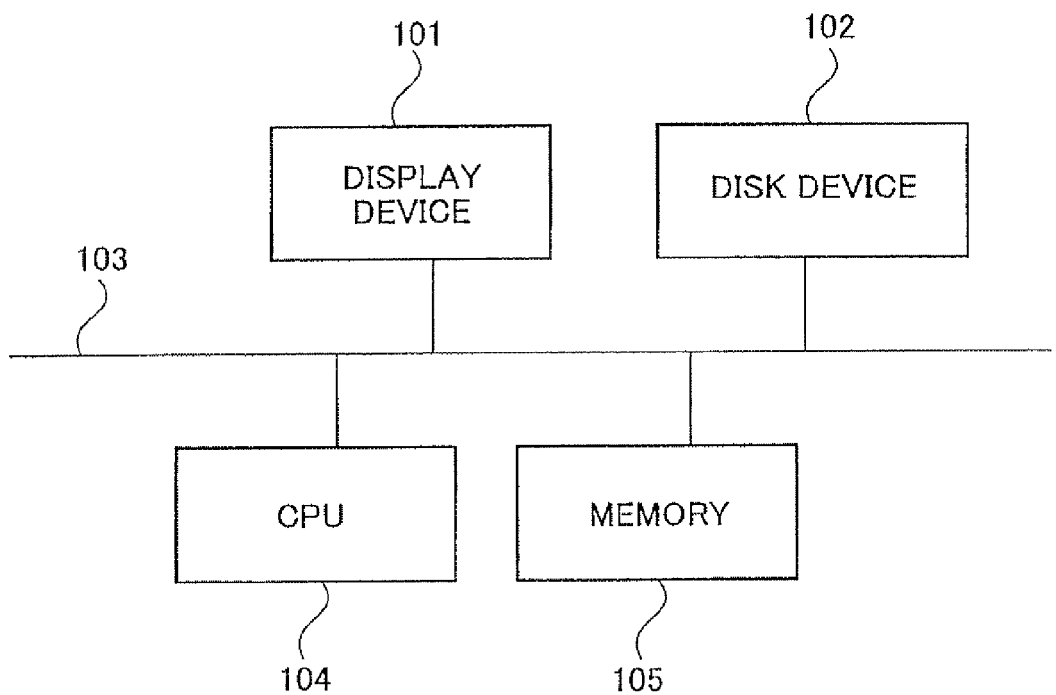
{FIG. 13} A block diagram illustrating a configuration example of a computer constituting components, other than the measurement section, of the side channel attack resistance evaluation apparatus of the present embodiment.

FIG. 13 is a block diagram illustrating a configuration example of a computer constituting components, other than the measurement section, of the side channel attack resistance evaluation apparatus.

A program describing the operation illustrated in the flowcharts of FIGS. 10 to 12 is stored in a disk device 102 such as a hard disk device or storage device such as an ROM (in FIG. 13, the disk device is illustrated), and the side channel information from the measurement section is stored in the disk device 102 or a memory 105 such as a DRAM. The program implements the functions (functions of the noise removal section, passband determination section, and DSCA) of the side channel attack resistance evaluation apparatus and is executed by a CPU 104. A display device 101 such as an LCD displays a DSCA evaluation result and information processing state. Reference numeral 103 denotes a bus such as a data bus, and reference numeral 105 denotes a memory such as a DRAM that stores information necessary for the CPU 104 to perform information processing. The side channel information from the measurement section is input to the computer through the bus 103. The program is provided in the form of a computer-readable information recording medium such as a flexible dish (FD: floppy-disk, etc.), a CD-ROM, a DVD, or a Flashmemory, or through a network such as the Internet. When the program is loaded into the computer and executed, the channel attack resistance evaluation apparatus may be realized.

Although the exemplary embodiments of the present invention have been described in detail, it should be understood that the present invention can be practiced in various forms without departing from the sprit and scope of the invention as defined by the appended claims. Thus, the above embodiments are merely illustrative and should not be considered restrictive in any way. The scope of the present invention is defined by the appended claims and not restricted by the descriptions of the specification and abstract. Further, all variations and modifications which come within the equivalent range of the claims are embraced in the scope of the present invention.

This application is based upon and claims the benefit of priority from prior Japanese Patent Application No. 2008-026374 (filed Feb. 6, 2008), the entire contents of which are incorporated herein by reference.

{Industrial Applicability}

The present invention is applied to an apparatus, a method, and a program that perform evaluation of resistance against differential side channel analysis using side channel information leaking from an encryption device.

{Reference Signs List}
 10: Encryption device
 20: measurement section
 30: Noise removal section
 40: Passband determination section
 41: DFT processing section
 42: Power spectrum analysis section
 43: DFA processing section
 50: DSCA evaluation section

The invention claimed is:

1. A side channel attack resistance evaluation apparatus that performs evaluation of resistance against differential side channel analysis using side channel information leaking from an encryption device, said apparatus comprising:
   a measurement circuit that measures the side channel information leaking from the encryption device;
   a noise removal circuit that removes noise from the side channel information measured by the measurement circuit, by using a band-pass filter;
   a passband determination circuit comprising a discrete Fourier transform (DFT) processing circuit and a differential frequency analysis (DFA) processing circuit, the discrete Fourier transform processing circuit calculating power spectrum of the side channel information for each frequency component by applying discrete Fourier transform processing to the side channel information measured by the measurement circuit, the differential frequency analysis processing circuit applying a differential frequency analysis to the power spectrum and determining a frequency component obtained as a result of the differential frequency analysis as the passband of the band-pass filter used in the noise removal circuit; and
   an evaluation circuit that applies differential side channel analysis to the side channel information that has been subjected to the noise removal by the noise removal circuit and evaluates resistance against the differential side channel analysis.

2. A side channel attack resistance evaluation method that evaluates resistance against differential side channel analysis using side channel information leaking from an encryption device, said method comprising the following steps that are performed in a side channel attack resistance evaluation apparatus:
   measuring the side channel information leaking from the encryption device;
   calculating power spectrum of the side channel information for each frequency component by applying discrete Fourier transform (DFT) processing to the measured side channel information, applying a differential frequency analysis (DFA) to the power spectrum, and determining, as the passband of a band-pass filter, a frequency component obtained as a result of the differential frequency analysis;
   removing noise from the measured side channel information by using the band-pass filter for which the passband has been determined; and
   applying differential side channel analysis to the side channel information that has been subjected to the noise removal and evaluating resistance against the differential side channel analysis.

3. A non-transitory computer-readable medium having stored therein a side channel attack resistance evaluation program allowing a computer that performs evaluation of resistance against differential side channel analysis using side channel information leaking from an encryption device to execute:

processing of calculating power spectrum of the side channel information for each frequency component by applying discrete Fourier transform (DFT) processing to the measured side channel information leaking from the encryption device, applying a differential frequency analysis (DFA) to the power spectrum, and determining, as the passband of a band-pass filter, a frequency component obtained as a result of the differential frequency analysis;

processing of removing noise from the measured side channel information by using the band-pass filter for which the passband has been determined; and processing of applying differential side channel analysis to the side channel information that has been subjected to the noise removal and evaluating resistance against the differential side channel analysis.

* * * * *